(12) United States Patent
Yu et al.

(10) Patent No.: US 12,547,876 B2
(45) Date of Patent: Feb. 10, 2026

(54) METHOD OF EVALUATING DATA, TRAINING METHOD, ELECTRONIC DEVICE, AND STORAGE MEDIUM

(71) Applicant: Beijing Baidu Netcom Science Technology Co., Ltd., Beijing (CN)

(72) Inventors: Wenli Yu, Beijing (CN); Guoqiang Yang, Beijing (CN); Wei Liu, Beijing (CN); Bo Zhang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 51 days.

(21) Appl. No.: 17/995,278

(22) PCT Filed: Mar. 22, 2022

(86) PCT No.: PCT/CN2022/082281
§ 371 (c)(1),
(2) Date: Sep. 30, 2022

(87) PCT Pub. No.: WO2023/040230
PCT Pub. Date: Mar. 23, 2023

(65) Prior Publication Data
US 2024/0220772 A1    Jul. 4, 2024

(30) Foreign Application Priority Data
Sep. 17, 2021 (CN) .......................... 202111096048.3

(51) Int. Cl.
*G06N 3/045* (2023.01)
*G06F 16/951* (2019.01)
*G06N 3/09* (2023.01)

(52) U.S. Cl.
CPC ........... *G06N 3/045* (2023.01); *G06F 16/951* (2019.01); *G06N 3/09* (2023.01)

(58) Field of Classification Search
CPC .......... G06N 3/045; G06N 3/09; G06F 16/951
See application file for complete search history.

(56) References Cited

U.S. PATENT DOCUMENTS

| 7,451,388 B1 | 11/2008 | Henzinger et al. |
| 8,442,984 B1 | 5/2013 | Pennock et al. |
| (Continued) | | |

FOREIGN PATENT DOCUMENTS

| CN | 102486774 | 6/2012 |
| CN | 102663054 | 9/2012 |
| (Continued) | | |

OTHER PUBLICATIONS

Extended European Search Report, issued in the corresponding European patent application No. 22773585.9, dated Jul. 14, 2023, 8 pages.
(Continued)

*Primary Examiner* — Casey R. Garner
(74) *Attorney, Agent, or Firm* — HSML P.C.

(57) ABSTRACT

A method of evaluating data, a method of training an evaluation model, an electronic device, and a storage medium are provided, and relate to a field of a computer technology, in particular to fields of intelligent search and deep learning technologies. The method of evaluating data includes: acquiring, in response to a request for identifying a quality of index data to be identified, target association data of a target webpage corresponding to the index data to be identified, wherein the target webpage is a webpage having an unknown web content, and the target association data indicates a quality of the target webpage corresponding to the index data to be identified; and obtaining, based on the target association data, a quality evaluation result for the index data to be identified.

13 Claims, 7 Drawing Sheets

(56) References Cited

U.S. PATENT DOCUMENTS

| | | | |
|---|---|---|---|
| 9,183,499 | B1 | 11/2015 | Krivokon et al. |
| 2002/0129014 | A1 | 9/2002 | Kim et al. |
| 2009/0164446 | A1 | 6/2009 | Holt et al. |
| 2009/0216760 | A1 | 8/2009 | Bennett |
| 2011/0161260 | A1* | 6/2011 | Burges ............... G06F 16/9566 707/711 |
| 2019/0073365 | A1 | 3/2019 | Jamshidi |
| 2021/0319314 | A1* | 10/2021 | Perez ................. G06F 40/284 |

FOREIGN PATENT DOCUMENTS

| | | |
|---|---|---|
| CN | 104615680 | 5/2015 |
| CN | 108134784 | 6/2018 |
| CN | 111222031 | 6/2020 |
| CN | 111488513 | 8/2020 |
| CN | 111831936 | 10/2020 |
| CN | 111967503 | 11/2020 |
| CN | 113326418 | 8/2021 |
| CN | 113806660 | 12/2021 |
| EP | 1006458 | 6/2000 |
| JP | 2019-074894 | 5/2009 |
| WO | 2006/034038 | 3/2006 |

OTHER PUBLICATIONS

Faliang Li, "Research on the Method of Detecting and Grading Web Spam Using Web Quality Features," Southwest Jiaotong University, 2013, 70 pages, English abstract on p. 7 of the copy submitted.

Yuanxiang He et al., Ranking Algorithm Based on User Behavior Model, Journal of Lanzhou University of Arts and Science (Natural Sciences), vol. 29, No. 3, May 10, 2015, pp. 63-67 and 111; English abstract on p. 111.

Office Action, issued in the corresponding Chinese Patent Application No. 202111096048.3, dated May 11, 2023, 9 pages.

Office Action, issued in the corresponding Japanese Patent Application No. 2022-558470, dated Nov. 1, 2023, 6 pages with machine translation.

International Search Report and Written Opinion, issued in the corresponding PCT Application No. PCT/CN2022/082281, dated May 27, 2022, 10 pages.

* cited by examiner

METHOD OF EVALUATING DATA, TRAINING METHOD, ELECTRONIC DEVICE, AND STORAGE MEDIUM

This application is a Section 371 National Stage Application of International Application No. PCT/CN2022/082281, filed on Mar. 22, 2022, entitled "METHOD AND APPARATUS OF EVALUATING DATA, TRAINING METHOD AND APPARATUS, ELECTRONIC DEVICE, AND STORAGE MEDIUM", which claims priority to Chinese Patent Application No. 202111096048.3 filed on Sep. 17, 2021, which is incorporated herein by reference in its entirety.

TECHNICAL FIELD

The present disclosure relates to a field of a computer technology, in particular to a field of an intelligent search technology, and specifically to a method of evaluating data, a method of training an evaluation model, an electronic device, and a storage medium.

BACKGROUND

In the Internet era, index data may be generated by processing acquired webpages. A search engine may perform, based on a retrieval demand of a user, a matching operation on the index data corresponding to the retrieval demand, and present a corresponding webpage to the user based on the index data. A quality of the webpage presented to the user by the search engine may affect a retrieval experience of the user.

SUMMARY

The present disclosure provides a method of evaluating data, a method of training an evaluation model, an electronic device, and a storage medium.

According to an aspect of the present disclosure, a method of evaluating data is provided, including: acquiring, in response to a request for identifying a quality of index data to be identified, target association data of a target webpage corresponding to the index data to be identified, wherein the target webpage is a webpage having an unknown web content, and the target association data indicates a quality of the target webpage corresponding to the index data to be identified; and obtaining, based on the target association data, a quality evaluation result for the index data to be identified.

According to another aspect of the present disclosure, a method of training an evaluation model is provided, including: determining a plurality of quality problem types for index data; acquiring, for each quality problem type of the plurality of quality problem types, training data matched with each quality problem type and a label corresponding to the training data, wherein the training data includes target association data of a sample webpage corresponding to sample index data, the sample webpage is a webpage having an unknown web content, and the label indicates a quality of the sample index data; and training the evaluation model by using the training data and the label so as to obtain a trained evaluation model.

According to another aspect of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the methods as described above.

According to another aspect of the present disclosure, a non-transitory computer-readable storage medium having computer instructions therein is provided, and the computer instructions are configured to cause a computer to implement the methods as described above.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein.

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to embodiments described herein without departing from the scope and spirit of the present disclosure. Likewise, for clarity and conciseness, descriptions of well-known functions and structures are omitted in the following description.

The present disclosure provides a method and an apparatus of evaluating data, a method and an apparatus of training an evaluation model, an electronic device, a storage medium, and a program product.

According to embodiments of the present disclosure, the method of evaluating data includes: acquiring, in response to a request for identifying a quality of index data to be identified, target association data of a target webpage corresponding to the index data to be identified, wherein the target webpage is a webpage having an unknown web content, and the target association data indicates a quality of the target webpage corresponding to the index data to be identified; and obtaining, based on the target association data, a quality evaluation result for the index data to be identified.

According to embodiments of the present disclosure, the target association data may indicate a quality of the target webpage corresponding to the index data to be identified, and a quality evaluation result for the target webpage may be obtained based on the target association data. The quality evaluation result for the index data to be identified may indicate the quality result of the target webpage corresponding to the index data to be identified. Therefore, the quality evaluation result for the index data to be identified may be obtained based on the target association data. Then the quality evaluation result for the index data to be identified corresponding to the quality result of the target webpage may be obtained based on the target association data without acquiring the web content of the target webpage.

Figure 1:
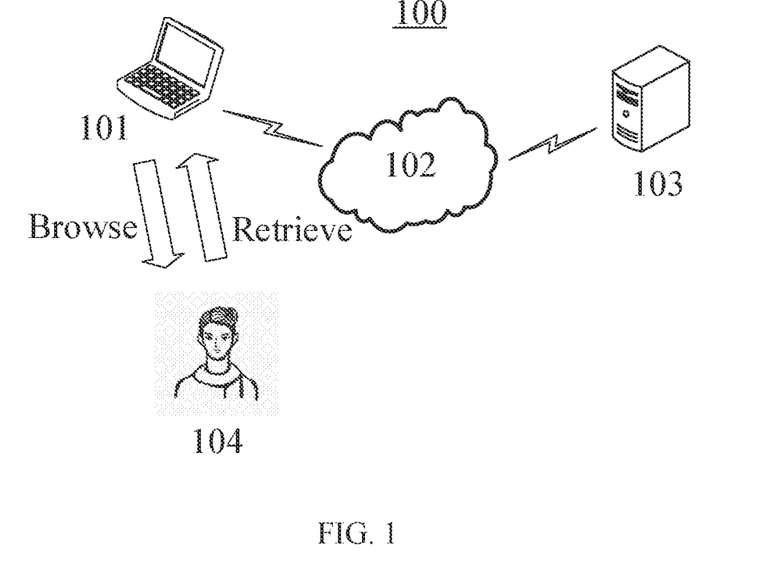
FIG. 1 schematically shows an application scenario of a method and an apparatus of evaluating data according to embodiments of the present disclosure.

FIG. 1 schematically shows an application scenario of a method and an apparatus of evaluating data according to embodiments of the present disclosure.

It should be noted that FIG. 1 is only an example of a scenario to which embodiments of the present disclosure may be applied to help those skilled in the art understand the technical content of the present disclosure, but it does not mean that embodiments of the present disclosure may not be applied to other devices, systems, environments or scenarios.

As shown in FIG. 1, the application scenario may include a terminal device 101, a network 102, and a server 103. The network 102 is a medium used to provide a communication link between the terminal device 101 and the server 103. The network 102 may include various connection types, such as wired or wireless communication links, optical fiber cables, and the like.

The terminal device 101 used by a user 104 may interact with the server 103 via the network 102, so that the user 104 may perform a retrieval operation or browse a webpage generated based on the retrieval operation. Various communication client applications may be installed on the terminal device 101, such as knowledge reading applications, web browser applications, search applications, instant messaging tools, mailbox clients and/or social platform software, etc. (for example only).

The terminal device 101 may be various electronic devices having display screens and supporting web browsing, including but not limited to smartphones, tablet computers, laptop computers, desktop computers, etc.

The server 103 may be a server that provides various services, such as a background management server (for example only) that provides a support for a content browsed by the user 104 using the terminal device 101. The background management server may obtain high-quality index data by using the method of evaluating data in embodiments of the present disclosure, and feed back, based on a retrieval operation of the user 104 and high-quality index data matched with the retrieval operation, a high-quality target webpage corresponding to the index data to the terminal device 101 for the user 104 to browse, so that a retrieval experience of the user 104 may be improved.

The method of evaluating data provided by embodiments of the present disclosure may generally be performed by the server 103. Accordingly, the apparatus of evaluating data provided by embodiments of the present disclosure may also be provided in the server 103. The method of evaluating data provided by embodiments of the present disclosure may also be performed by a server or server cluster different from the server 103 and capable of communicating with the terminal device 101 and/or the server 103. Accordingly, the apparatus of evaluating data provided by embodiments of the present disclosure may also be provided in a server or server cluster different from the server 103 and capable of communicating with the terminal device 101 and/or the server 103.

It should be understood that the number of terminal device, network and server shown in FIG. 1 is only schematic. According to implementation needs, any number of terminal device, network and server may be provided.

Figure 2:
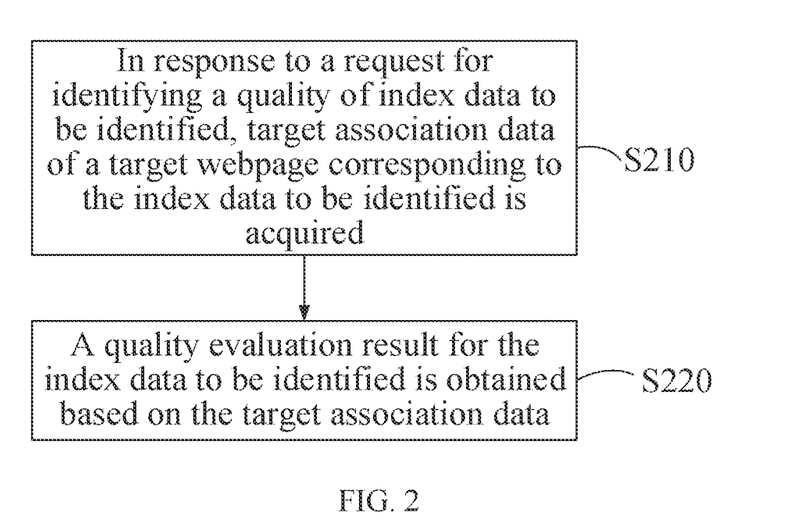
FIG. 2 schematically shows a flowchart of a method of evaluating data according to embodiments of the present disclosure.

FIG. 2 schematically shows a flowchart of a method of evaluating data according to embodiments of the present disclosure.

As shown in FIG. 2, the method includes operations S210 to S220.

In operation S210, in response to a request for identifying a quality of index data to be identified, target association data of a target webpage corresponding to the index data to be identified is acquired, the target webpage is a webpage having an unknown web content, and the target association data indicates a quality of the target webpage corresponding to the index data to be identified.

In operation S220, a quality evaluation result for the index data to be identified is obtained based on the target association data.

According to embodiments of the present disclosure, the index data to be identified may be index data used to search a webpage. For example, a search engine may determine, based on a search term entered by the user, index data matched with the search term, for example, from a search database; and obtain a webpage related to the search term required by the user based on the index data matched with the search term.

According to embodiments of the present disclosure, the index data to be identified may include a URL (Uniform Resource Locator) of a website where the target webpage is located, and/or a keyword contained in a web content of the target webpage, and/or a link relationship with other webpage.

According to embodiments of the present disclosure, the target association data may be data related to a content of a non-target webpage and used to indicate the quality of the target webpage. For example, the target association data may be data related to a source webpage linked to the target webpage, and/or data related to a webpage linked to the target webpage, and/or user feedback data for the target webpage. However, the present disclosure is not limited to this, as long as the data can indicate the quality of the target webpage corresponding to the index data to be identified.

According to embodiments of the present disclosure, the target association data may indicate the quality of the target webpage corresponding to the index data to be identified. Therefore, a quality result of the target webpage may be determined based on the target association data. Further, the quality evaluation result for the index data to be identified corresponding to the target webpage may be obtained based on the target association data.

For example, the target webpage may be a high-quality webpage. For example, the target webpage may contain a content that meets a specification requirement and that is suitable for presenting to the user. The target webpage may also be a low-quality webpage. For example, the target webpage may contain a content that violates laws and regulations or a content that violates public order and good customs, etc. However, the present disclosure is not limited to this. The target webpage may also be, for example, a blank webpage, a webpage that lacks a valid link, or an expired webpage. The high-quality webpage and the low-quality webpage may correspond to different target association data.

According to embodiments of the present disclosure, the target association data may indicate the quality of the target webpage corresponding to the index data to be identified, and the quality evaluation result for the target webpage may be obtained based on the target association data. The quality evaluation result for the index data to be identified may indicate the quality result of the target webpage corresponding to the index data to be identified. Therefore, the quality evaluation result for the index data to be identified may be obtained based on the target association data. Then the quality evaluation result for the index data to be identified corresponding to the quality result of the target webpage may be obtained based on the target association data without acquiring the web content of the target webpage.

According to exemplary embodiments of the present disclosure, the quality evaluation result for the target webpage corresponding to the index data to be identified may be determined by the quality evaluation result for the index data to be identified. Therefore, a target webpage with a high-quality web content may be selected based on the quality evaluation result for the index data to be identified, and may be presented to the user based on the index data to be identified. In this way, it is possible to improve the quality of the web content presented based on the index data to be identified when the web content is unknown, and a user experience may be improved.

The method of evaluating data of embodiments of the present disclosure will be further described below in conjunction with specific embodiments and with reference to FIG. 3 to FIG. 6.

According to embodiments of the present disclosure, the target association data may include at least one selected from: attribute data related to the target webpage, attribute data of a website related to the target webpage, or user feedback data for the target webpage.

According to embodiments of the present disclosure, the attribute data related to the target webpage may include link-related data of the target webpage, such as a number of link, a correspondence between a link and other webpage, etc.

According to embodiments of the present disclosure, the attribute data related to the target webpage may include at least one selected from: a number of link to an outside of the webpage, a number of link to an inside of the webpage, or link-related text data of the webpage.

According to embodiments of the present disclosure, the link to the outside of the webpage may include a link on the target webpage that may link to other webpage, and the link to the inside of the webpage may include a link on the target webpage that may link to an information contained in the webpage. For example, the link to the inside of the webpage may be a link to a text information or an image information contained in the webpage. Accordingly, the number of link to the outside of the webpage may include a number of link on the target webpage that may link to other webpage, and the number of link to the inside of the webpage may include a number of link on the target webpage that may link to an information contained in the webpage.

According to embodiments of the present disclosure, the link-related text data of the webpage may include an address link text of a webpage, such as http://www.xxyy.com/html/html-aaa.html, but not limited to this, it may further include link-related text data of the webpage, such as text data that may link to other webpage, or text data that may link to an information contained in the webpage.

According to embodiments of the present disclosure, the link-related text data of the webpage may indicate the quality of the target webpage. For example, the link-related text data of the webpage may be text data of the target webpage that links to outside the webpage, such as "The truth of ABCD". If "The truth of ABCD" contains an illegal information, the quality of the target webpage may be determined as a low quality. The quality evaluation result for the index data to be identified corresponding to the target webpage may be obtained based on the link-related text data of the webpage, so that the quality of the index data to be identified may be evaluated more accurately without acquiring the web content of the target webpage.

According to embodiments of the present disclosure, the quality evaluation result for the index data to be identified may be obtained based on the number of link to the outside of the webpage and/or the number of link to the inside of the webpage; the quality evaluation result for the index data to be identified may be determined based on the link-related text data of the webpage.

According to exemplary embodiments of the present disclosure, the link-related text data of the webpage may be determined from the target association data as target association data of a target type. A target association feature of the target type, such as a text feature, may be extracted from the target association data of the target type as the target association data. The quality evaluation result for the index data to be identified may be obtained based on the text feature.

Figure 3:
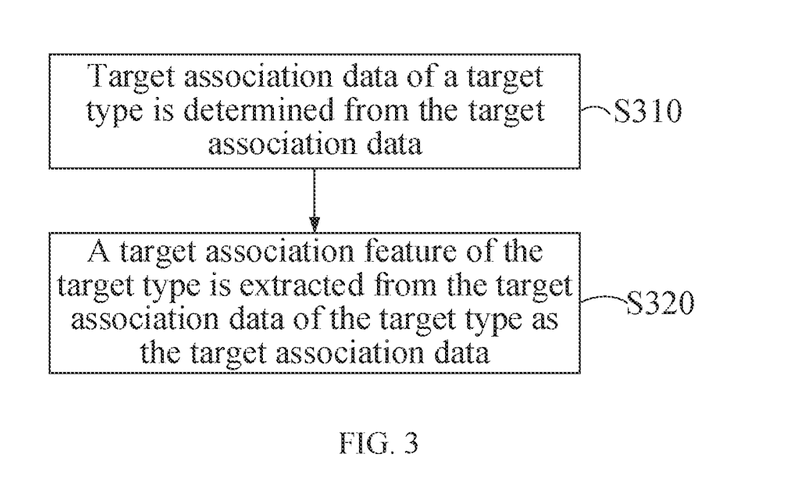
FIG. 3 schematically shows a flowchart of extracting a target association feature of a target type according to embodiments of the present disclosure.

FIG. 3 schematically shows a flowchart of extracting a target association feature of a target type according to embodiments of the present disclosure.

As shown in FIG. 3, the method of evaluating data further includes operations S310 to S320 before operation S220.

In operation S310, target association data of a target type is determined from the target association data.

In operation S320, a target association feature of the target type is extracted from the target association data of the target type as the target association data.

According to embodiments of the present disclosure, the target association feature may be extracted from the target association data of the target type by using a feature extraction model. The feature extraction model may be constructed based on a neural network. For example, the feature extraction model may include a Long Short-Term Memory (LSTM) network, a convolutional neural network (CNN), and/or the like. Those skilled in the art may construct the feature extraction model to extract the target association feature from the target association data of the target type according to actual desires.

According to embodiments of the present disclosure, the target association feature of the target type may indicate a feature of a semantic information in the target association data, and may also indicate a feature of a keyword or keyword phrase in the target association data of the target type. Therefore, by extracting the text feature from the target association feature of the target type as the target association data, the quality of the target webpage may be indicated more accurately, and then the quality evaluation result for the index data to be identified may be determined more accurately.

According to exemplary embodiments of the present disclosure, when the target association data of the target type includes the link-related text data of the webpage, the feature extraction model may adopt a text feature extraction model.

According to embodiments of the present disclosure, the text feature may be extracted from the link-related text data of the webpage by using the text feature extraction model.

According to embodiments of the present disclosure, the text feature extraction model may include a tokenization module and a convolutional neural network module connected in sequence.

According to embodiments of the disclosure, the link-related text data of the webpage may be "Daily News Roundup", "Examination Registration Entrance", and/or other data.

According to embodiments of the present disclosure, the tokenization module may include a model for tokenizing corpus, such as Hidden Markov Model (HMM) or Conditional Random Field (CRF) model. Embodiments of the present disclosure do not limit a specific setting of the tokenization module.

According to embodiments of the present disclosure, the convolutional neural network module may be, for example, a Convolutional Neural Network (CNN) or a Text Convolutional Neural Network (TextCNN). Embodiments of the present disclosure do not limit a specific setting of the convolutional neural network module.

Figure 4:
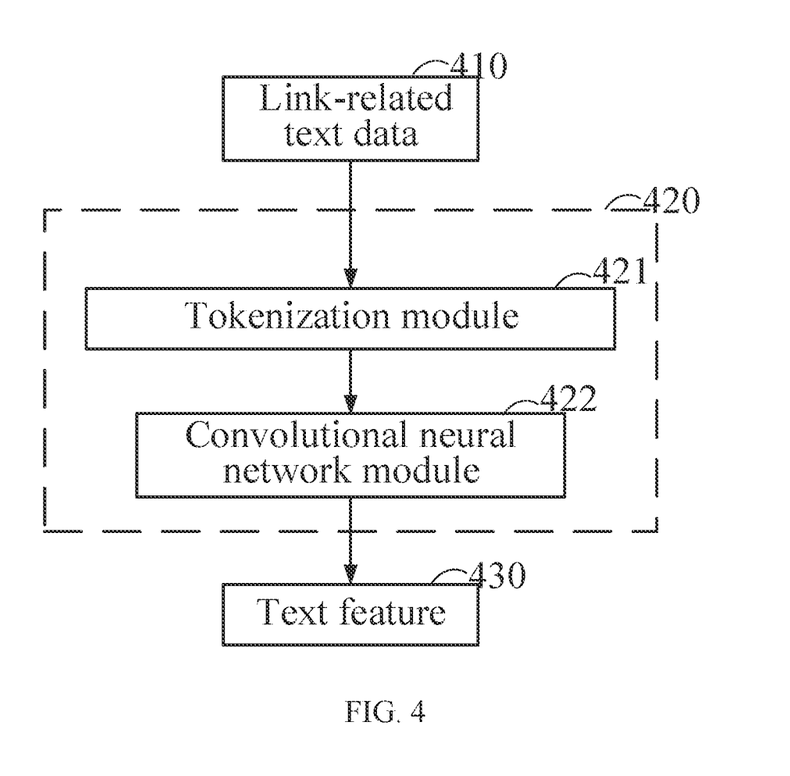
FIG. 4 schematically shows a schematic diagram of extracting a text feature according to embodiments of the present disclosure.

FIG. 4 schematically shows a schematic diagram of extracting a text feature according to embodiments of the present disclosure.

As shown in FIG. 4, link-related text data of the webpage 410 may be "Weekly Top 10 XX News Roundup", and a text feature extraction model 420 includes a tokenization module 421 and a convolutional neural network module 422 connected in sequence. The link-related text data of the webpage 410 may be input into the text feature extraction model 420. The tokenization module 421 may tokenize the link-related text data of the webpage 410 into data blocks including "Weekly", "Top 10", "XX", "News" and "Roundup". These data blocks may be input into the convolutional neural network module 422 to generate a text feature 430.

According to embodiments of the present disclosure, the convolution neural network module includes the Text Convolution Neural Network (TextCNN), the link-related text data is tokenized into a plurality of data blocks by using the tokenization module, and a text feature of each data block is extracted based on the Text Convolution Neural Network (TextCNN), so that a calculation speed of the text feature extraction model may be improved to quickly extract the text feature.

According to embodiments of the present disclosure, it is possible to extract a more critical and concise text feature by using the text feature extraction model, and the text feature is used as the target association feature of the target type and then as the target association data to determine the quality evaluation result for the index data to be identified, so as to improve the evaluation accuracy.

According to embodiments of the present disclosure, the target association data may also be user feedback data for the target webpage. The user feedback data for the target webpage includes at least one selected from: add-to-favorites behavior data, thumb-up behavior data, sharing behavior data, or comment data.

According to embodiments of the present disclosure, the user feedback data for the target webpage may include data generated by a user operation for the content of the target webpage, such as comment data for the target webpage.

According to embodiments of the present disclosure, the user feedback data for the target webpage may initially indicate a user evaluation result for the target webpage, and the user evaluation result for the target webpage may indicate the quality of the target webpage. For example, if the user feedback data for the target webpage is comment data, it may be identified whether a classification result for the comment data belongs to a positive category or a negative category. If the classification result for the comment data belongs to the positive category, it may initially indicate that the user evaluation result for the target webpage is a positive evaluation, and the quality of the target webpage may be determined as a high quality according to the positive user evaluation result for the target webpage. If the classification result for the comment data belongs to the negative category, the quality of the target webpage may be determined as a low quality according to the negative user evaluation result for the target webpage.

According to embodiments of the present disclosure, if the target association data is the user feedback data for the target webpage, the user feedback data for the target webpage may initially indicate the user evaluation result for the target webpage, and the quality of the target webpage may be determined according to the user evaluation result for the target webpage. Therefore, the quality evaluation result for the index data to be identified obtained based on the user feedback data for the target webpage is obtained based on the user evaluation result for the target webpage, so that the accuracy of the quality evaluation result for the index data to be identified may be improved.

According to embodiments of the present disclosure, the user feedback data for the target webpage may be data generated by a user operation behavior for the target webpage, and the user operation behavior for the target webpage may truly reflect the user experience for the target webpage. Therefore, by using the user feedback data for the target webpage as the target association data, the quality of the target webpage may be indicated effectively. Therefore, in practice, the quality evaluation result for the index data to be identified may be obtained based on the user feedback data for the target webpage, so as to take into account both the speed of data evaluation and the accuracy of data evaluation.

According to embodiments of the present disclosure, the user feedback data for the target webpage may be determined as the target association data of the target type through the operations shown in FIG. 3.

According to embodiments of the present disclosure, the user feedback data for the target webpage may include at least one selected from the add-to-favorites behavior data, the thumb-up behavior data, the sharing behavior data, or the comment data, and may also include user feedback data for a website related to the target webpage.

According to exemplary embodiments of the present disclosure, if the target association data of the target type includes the user feedback data for the target webpage, the feature extraction model may adopt a feedback feature extraction model.

According to embodiments of the present disclosure, the feedback feature extraction model may include an encoding and decoding module, a first fully connected layer, a Long Short-Term Memory network module, and a second fully connected layer connected in sequence.

According to embodiments of the present disclosure, the encoding and decoding module may include a transformer (an encoder and a decoder). The first fully connected layer or the second fully connected layer includes a deep neural network (DNN). The Long Short-Term Memory network module includes a Long Short-Term Memory (LSTM) network, or a neural network model constructed based on the Long Short-Term Memory (LSTM) network, such as a bidirectional Long Short-Term Memory (Bi-LSTM) network.

It should be understood that the first fully connected layer or the second fully connected layer may contain one or more hidden layers. Embodiments of the present disclosure do not limit a number of hidden layer contained in the first fully connected layer or the second fully connected layer.

According to embodiments of the present disclosure, the feedback feature extraction model includes a Long Short-Term Memory network module. The Long Short-Term Memory network module may process a temporal information in the user feedback data and acquire a semantic information in the user feedback data. Therefore, the feedback feature extraction model may be used to extract the user feedback feature from the user feedback data for the target webpage, the user feedback feature may be used to indicate the user evaluation result for the target webpage, and the quality of the target webpage may be determined according to the evaluation result, so that the accuracy of the webpage quality indicated by the target association data may be improved effectively.

Figure 5:
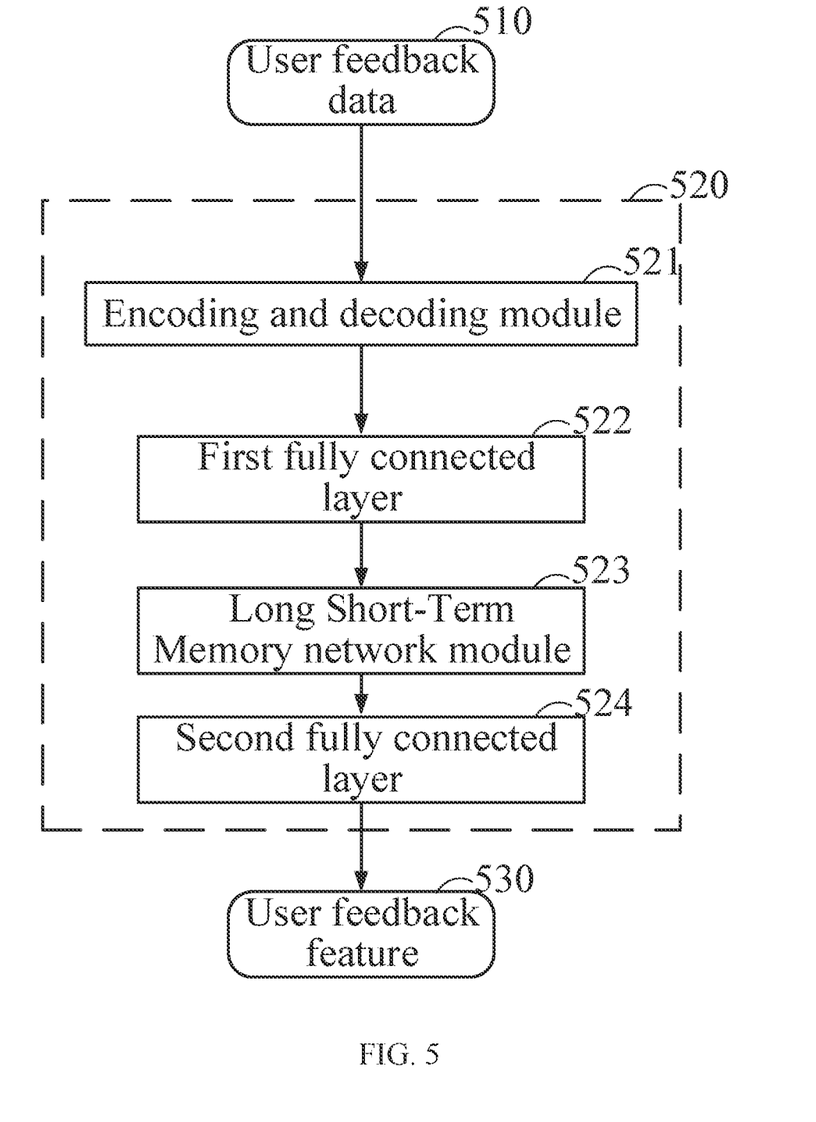
FIG. 5 schematically shows a schematic diagram of extracting a user feedback feature according to embodiments of the present disclosure.

FIG. 5 schematically shows a schematic diagram of extracting a user feedback feature according to embodiments of the present disclosure.

As shown in FIG. 5, the user feedback data for the target webpage may be user feedback data 510, and a feedback feature extraction model 520 includes an encoding and decoding module 521, a first fully connected layer 522, a Long Short-Term Memory network module 523, and a second fully connected layer 524 connected in sequence. The user feedback data 510 may be input into the feedback feature extraction model 520, and processed by the encoding and decoding module 521, the first fully connected layer 522, the Long Short-Term Memory network module 523 and the second fully connected layer 524 connected in sequence, then a user feedback feature 530 may be generated.

For example, the user feedback data 510 may include user comment data, such as comment data of "Why are all the links on the webpage invalid?" The user feedback feature 530 may be extracted from the user feedback data 510 by using the feedback feature extraction model 520.

According to embodiments of the present disclosure, the user feedback feature is extracted from the user feedback data for the target webpage through the feedback feature extraction model, and the quality of the target webpage is indicated based on the user feedback feature. In this way, it is possible to determine the quality of the target webpage and then obtain the quality evaluation result for the index data to be identified corresponding to the target webpage in a case that the web content of the target webpage is unknown. According to embodiments of the present disclosure, the target association data may also be the attribute data of the website related to the target webpage. The attribute data of the website related to the target webpage may include at least one selected from: a number of link to an inside of the website, a number of link to an outside of the website, and user feedback data for the website related to the target webpage.

According to embodiments of the present disclosure, the website related to the target webpage may be a source website of the target webpage. The attribute data of the source website of the target webpage may be used as a factor of the target association data to determine the quality evaluation result for the index data to be identified.

According to embodiments of the present disclosure, the link to the inside of the website may include a link to other webpage of the website, and the link to the outside of the website may include a link to a webpage of other website. Accordingly, the number of link to the inside of the website may include a number of link to other webpage of the website, and the number of link to the outside of the website may include a number of link to a webpage of other website.

According to embodiments of the present disclosure, the user feedback data for the website related to the target webpage may include data generated by a user operation on at least one webpage of the website, such as comment data, add-to-favorites behavior data, thumb-up behavior data, etc. for at least one webpage of the website.

According to embodiments of the disclosure, the user feedback data for the website related to the target webpage may indicate the quality evaluation result of a user for the target webpage related to the website. For example, if the thumb-up behavior data of the user for the website is greater than a predetermined thumb-up behavior threshold value, the quality of the website may be determined as a high quality, and then the quality of the target webpage related to the website may be determined as a high quality. If the thumb-up behavior data of the user for the website is less than the predetermined thumb-up behavior threshold value, the quality of the website may be determined as a low quality, and then the quality of the target webpage related to the website may be determined as a low quality.

According to embodiments of the present disclosure, the target association data may include the attribute data of the website related to the target webpage. By indicating the quality of the target webpage by the attribute data of the website related to the target webpage, a scope of a quality evaluation for the target webpage may be expanded, and the accuracy of the quality result of the target webpage may be improved, then the accuracy of the quality evaluation result for the index data to be identified corresponding to the quality result of the target webpage may be improved.

It should be noted that at least one selected from the attribute data related to the target webpage, the attribute data of the website related to the target webpage, or the user feedback data for the target webpage may be selected as the target association data according to actual application desires. For example, if an amount of the user feedback data for the target webpage meets a predetermined condition, the user feedback data for the target webpage may be selected as the target association data to obtain the quality evaluation result for the index data to be identified.

In order to further improve the accuracy of the quality evaluation result for the index data, both the attribute data related to the target webpage and the user feedback data for the target webpage may be used as the target association data to obtain the quality evaluation result for the index data to be identified, so as to improve the accuracy of the quality evaluation for the index data to be identified. It should be understood that if all the attribute data related to the target webpage, the attribute data of the website related to the target webpage and the user feedback data for the target webpage are used as the target association data, the quality evaluation result for the index data to be identified obtained based on the target association data may be most accurate, but a length of time it takes to perform the data evaluation may be increased. Those skilled in the art may perform a selection on the target association data according to an actual requirement for the length of time it takes to perform the data evaluation and an actual requirement for the accuracy of the data evaluation.

Link-related data of the target webpage may indicate a quality of a link on the target webpage, and thus may at least partially indicate the quality of the target webpage. By obtaining the quality evaluation result for the index data to be identified based on the attribute data related to the target webpage, the quality evaluation result for the index data to be identified may be obtained without acquiring the content of the target webpage, so that a speed of obtaining the quality evaluation result for the index data may be improved.

According to embodiments of the present disclosure, the quality evaluation result for the index data to be identified may be obtained based on the attribute data related to the target webpage and/or the attribute data of the website related to the target webpage, or the quality evaluation result for the index data to be identified may be obtained based on the user feedback feature extracted from the user feedback data for the target webpage.

According to embodiments of the present disclosure, the operation S220 of obtaining the quality evaluation result for the index data to be identified based on the target association data may include: inputting the target association data into an evaluation model to obtain the quality evaluation result for the index data to be identified.

According to embodiments of the present disclosure, the evaluation model may include a model constructed based on machine learning, such as a tree model and a neural network model.

According to embodiments of the present disclosure, the target association data may be input into the evaluation model to obtain the quality evaluation result for the index data to be identified. For example, two or more selected from the attribute data related to the target webpage, the attribute data of the website related to the target webpage and the user feedback data for the target webpage may be input into the evaluation model to obtain the quality evaluation result for the index data to be identified.

According to embodiments of the present disclosure, it is also possible to extract a text feature from the link-related text data of the webpage by using a text feature extraction model, and/or extract a user feedback feature from the user feedback data for the target webpage by using a feedback feature extraction model. The text feature and/or the user feedback feature may be input into the evaluation model together with the number of link to the outside of the webpage or the number of link to the inside of the webpage as the target association data to obtain the quality evaluation result for the index data to be identified.

Figure 6:
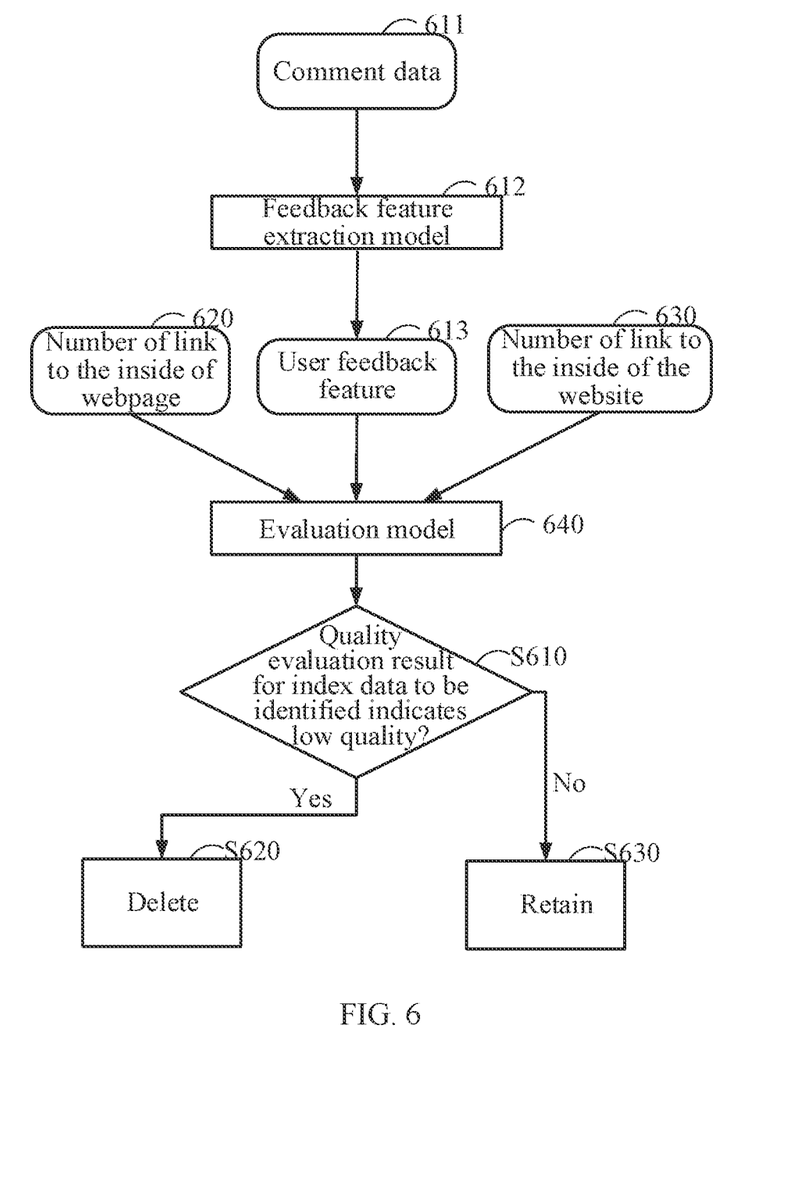
FIG. 6 schematically shows a schematic diagram of a method of evaluating data according to embodiments of the present disclosure.

FIG. 6 schematically shows a schematic diagram of a method of evaluating data according to embodiments of the present disclosure.

As shown in FIG. 6, the user feedback data for the target webpage may include comment data 611. The comment data 611 may be input into a feedback feature extraction model 612, and a user feedback feature 613 may be extracted from the comment data 611 by using the feedback feature extraction model 612. The user feedback feature 613 may be used as the target association data of the target type, and may be input into an evaluation model 640 together with a number of link to an inside of the webpage 620 and a number of link to an inside of a website 630. After processing of the evaluation model 640, the quality evaluation result for the index data to be identified may be output. In operation S610, it may be determined whether the quality evaluation result for the index data to be identified indicates a low quality or not. If the quality evaluation result for the index data to be identified indicates a low quality, a deletion operation S620 may be performed to delete the index data to be identified. If it is determined that the quality evaluation result for the index data to be identified does not indicate a low quality, a retain operation S630 may be performed to retain the index data to be identified.

According to embodiments of the present disclosure, an output of the evaluation model may be an evaluation data value x, $x \in [0, 1]$. If the evaluation data value x is less than a predetermined condition value, it is determined that the index data to be identified is high-quality index data, and if the evaluation data value x is greater than or equal to the predetermined condition value, it is determined that the index data to be identified is low-quality index data. The predetermined condition value may be selected according to actual desires, for example, it may be set to 0.5. Embodiments of the present disclosure do not limit a specific value of the predetermined condition value.

According to embodiments of the present disclosure, if the index data to be identified is high-quality index data, the high-quality index data may be retained in an index database, so that a high-quality webpage may be presented to the user based on the high-quality index data. If the index data to be identified is low-quality index data, the low-quality index data may be deleted from the index database to avoid presenting a low-quality webpage corresponding to the low quality index data to the user.

Figure 7:
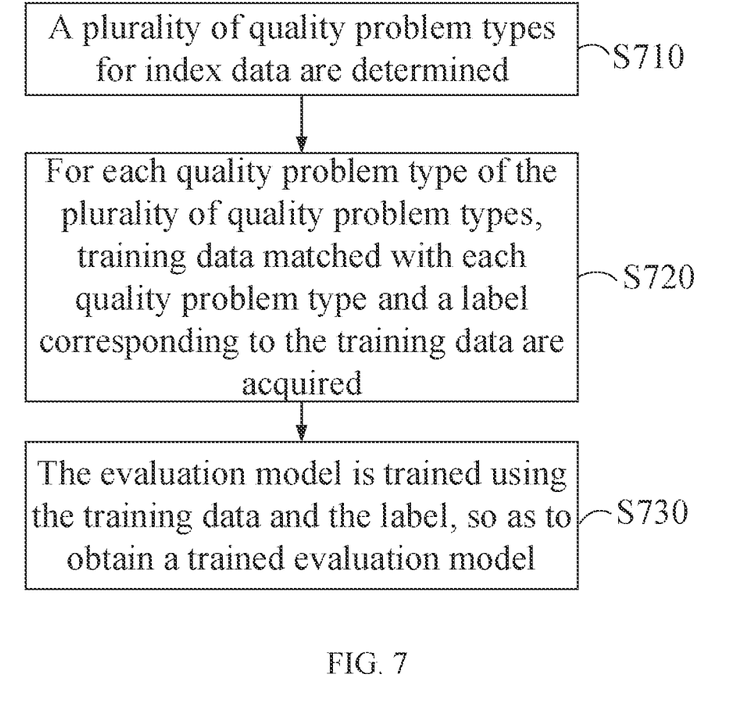
FIG. 7 schematically shows a flowchart of a method of training an evaluation model according to embodiments of the present disclosure.

FIG. 7 schematically shows a flowchart of a method of training an evaluation model according to embodiments of the present disclosure.

As shown in FIG. 7, the method includes operations S710 to S730.

In operation S710, a plurality of quality problem types for index data are determined.

In operation S720, for each quality problem type of the plurality of quality problem types, training data matched with each quality problem type and a label corresponding to the training data are acquired, the training data includes target association data of a sample webpage corresponding to sample index data, the sample webpage is a webpage having an unknown web content, and the label indicates a quality of the sample index data.

In operation S730, the evaluation model is trained using the training data and the label, so as to obtain a trained evaluation model.

According to embodiments of the present disclosure, the quality problem type of the sample index data may be a quality problem type corresponding to the sample webpage. The quality problem type of the sample index data may include a cheating type and a defect type. The cheating type may refer to, for example, a type of a content violating laws and regulations, a type of a content violating public order and good customs, etc. The defect type may refer to a blank type, a failure type, etc.

According to embodiments of the present disclosure, the sample webpage is a webpage having unknown web content, and the training data includes target association data of the sample webpage. A webpage quality result of the sample webpage may be indicated using the target association data of the sample webpage, and a quality of the sample index data may reflect the webpage quality of the sample webpage. Therefore, the quality of the sample index data may be determined according to the target association data.

According to embodiments of the present disclosure, by training the evaluation model using the label indicating the quality of the sample index data and using the target association data as the training data, it is possible to obtain a trained evaluation model that may determine the quality of the index data to be identified by using the target association data when the web content is unknown.

According to embodiments of the present disclosure, the evaluation model is trained using training data of a plurality of quality problem types, the training data is diverse, and a robustness of the trained evaluation model is improved. According to embodiments of the disclosure, training the evaluation model by using the training data and the label to obtain the trained evaluation model may include the following operations.

Training data of a target type is determined from the training data; a training feature of the target type is extracted from the training data of the target type; and the evaluation model is trained using the training feature of the target type and the label, so as to obtain the trained evaluation model.

According to embodiments of the present disclosure, by extracting the training feature of the target type from the training data of the target type, a key feature in the training data may be efficiently extracted. By training the evaluation model using the training feature of the target type and the label, a convergence speed of the training and an evaluation accuracy of the trained evaluation model may be improved.

According to embodiments of the present disclosure, the training data of the target type may include user feedback data for the sample webpage.

According to embodiments of the present disclosure, extracting the training feature of the target type from the training data of the target type may include: extracting a user feedback feature from the user feedback data for the sample webpage by using a feedback feature extraction model.

According to embodiments of the present disclosure, the feedback feature extraction model may include an encoding and decoding module, a first fully connected layer, a Long Short-Term Memory network module, and a second fully connected layer connected in sequence.

According to embodiments of the present disclosure, the training data of the target type may include link-related text data of the webpage.

According to embodiments of the present disclosure, extracting the training feature of the target type from the training data of the target type may include: extracting a text feature from the link-related text data of the webpage by using a text feature extraction model.

According to embodiments of the present disclosure, the text feature extraction model may include a tokenization module and a convolutional neural network module connected in sequence.

According to embodiments of the present disclosure, the target association data of the sample webpage may include at least one selected from: attribute data related to the sample webpage, attribute data of a website related to the sample webpage, or user feedback data for the sample webpage.

According to embodiments of the present disclosure, the attribute data related to the sample webpage may include at least one selected from: a number of link to an outside of the webpage, a number of link to an inside of the webpage, or link-related text data of the webpage.

According to embodiments of the disclosure, the attribute data of the website related to the sample webpage may include at least one selected from: a number of link to an inside of the website, a number of link to an outside of the website, or user feedback data for the website related to the sample webpage.

According to embodiments of the present disclosure, the user feedback data for the sample webpage may include at least one selected from: add-to-favorites behavior data, thumb-up behavior data, sharing behavior data, or comment data.

In the technical solution of the present disclosure, an acquisition, a storage, a use, a processing, a transmission, a provision and a disclosure of user personal data involved comply with provisions of relevant laws and regulations, and do not violate public order and good custom.

In the technical solution of the present disclosure, the acquisition or collection of user personal information has been authorized or allowed by users.

Figure 8:
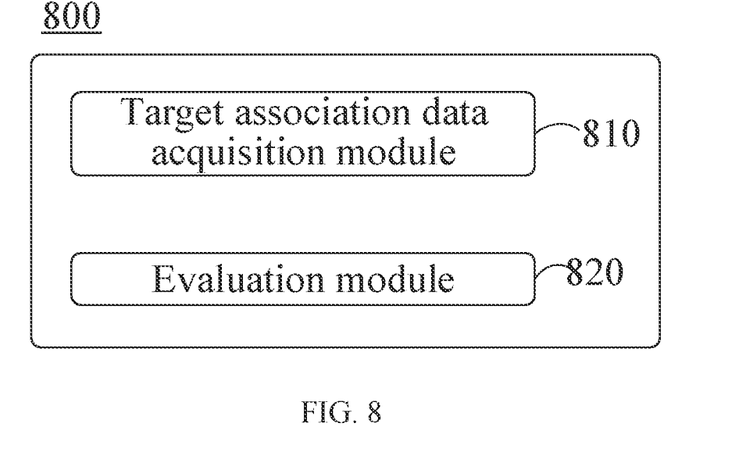
FIG. 8 schematically shows a block diagram of an apparatus of evaluating data according to embodiments of the present disclosure.

FIG. 8 schematically shows a block diagram of an apparatus of evaluating data according to embodiments of the present disclosure.

As shown in FIG. 8, an apparatus 800 of evaluating data may include a target association data acquisition module 810 and an evaluation module 820.

The target association data acquisition module 810 is used to acquire, in response to a request for identifying a quality of index data to be identified, target association data of a target webpage corresponding to the index data to be identified, wherein the target webpage is a webpage having an unknown web content, and the target association data indicates a quality of the target webpage corresponding to the index data to be identified.

The evaluation module 820 is used to obtain, based on the target association data, a quality evaluation result for the index data to be identified.

According to embodiments of the present disclosure, the apparatus of evaluating data may further include a target type determination module and an extraction module.

The target type determination module is used to determine, from the target association data, target association data of a target type.

The extraction module is used to extract a target association feature of the target type from the target association data of the target type as the target association data.

According to embodiments of the present disclosure, the target association data of the target type includes user feedback data for the target webpage, and the extraction module includes a first extraction unit.

The first extraction unit is used to extract a user feedback feature from the user feedback data for the target webpage by using a feedback feature extraction model, and the feedback feature extraction model includes an encoding and decoding module, a first fully connected layer, a Long Short-Term Memory network module, and a second fully connected layer connected in sequence.

According to embodiments of the present disclosure, the target association data of the target type includes link-related text data of the webpage, and the extraction module includes a second extraction unit.

The second extraction unit is used to extract a text feature from the link-related text data of the webpage by using a text feature extraction model, and the text feature extraction model includes a tokenization module and a convolutional neural network module connected in sequence.

According to embodiments of the present disclosure, the evaluation module includes an evaluation unit.

The evaluation unit is used to input the target association data into an evaluation model to obtain the quality evaluation result for the index data to be identified.

According to embodiments of the present disclosure, the target association data includes at least one selected from: attribute data related to the target webpage, attribute data of a website related to the target webpage, or user feedback data for the target webpage.

According to embodiments of the present disclosure, the attribute data related to the target webpage includes at least one selected from: a number of link to the outside of the webpage, a number of link to the inside of the webpage, or link-related text data of the webpage. The attribute data of the website related to the target webpage includes at least one selected from: a number of link to the inside of the website, a number of link to the outside of the website, or user feedback data for the website related to the target webpage. The user feedback data for the target webpage includes at least one selected from: add-to-favorites behavior data, thumb-up behavior data, sharing behavior data, or comment data.

Figure 9:
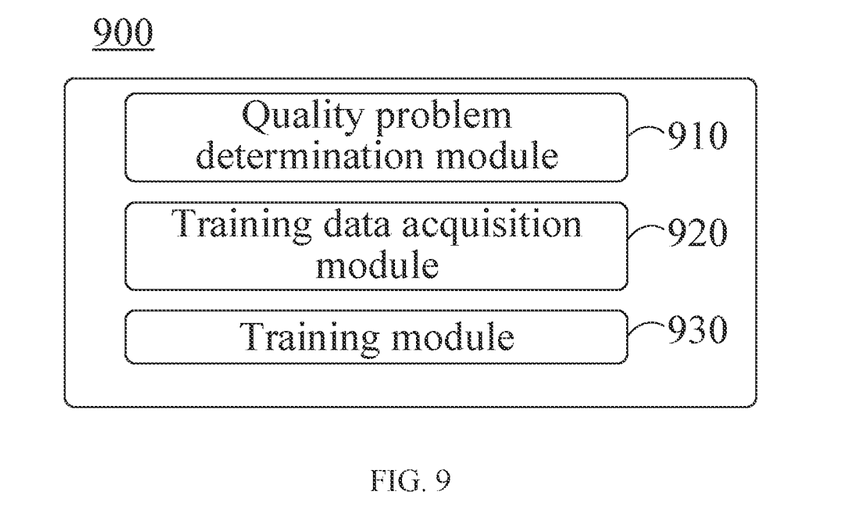
FIG. 9 schematically shows a block diagram of an apparatus of training an evaluation model according to embodiments of the present disclosure.

FIG. 9 schematically shows a block diagram of an apparatus of training an evaluation model according to embodiments of the present disclosure.

As shown in FIG. 9, an apparatus 900 of training an evaluation model includes a quality problem determination module 910, a training data acquisition module 920, and a training module 930.

The quality problem determination module 910 is used to determine a plurality of quality problem types for index data.

The training data acquisition module 920 is used to acquire, for each quality problem type of the plurality of quality problem types, training data matched with each quality problem type and a label corresponding to the training data, wherein the training data includes target association data of a sample webpage corresponding to sample index data, the sample webpage is a webpage having an unknown web content, and the label indicates a quality of the sample index data.

The training module 930 is used to train the evaluation model by using the training data and the label, so as to obtain a trained evaluation model.

According to embodiments of the present disclosure, the training module includes a determination unit, a third extraction unit, and a training unit.

The determination unit is used to determine, from the training data, training data of a target type.

The third extraction unit is used to extract a training feature of the target type from the training data of the target type.

The training unit is used to train the evaluation model by using the training feature of the target type and the label, so as to obtain the trained evaluation model.

According to embodiments of the present disclosure, the training data includes at least one selected from: attribute data related to the sample webpage, attribute data of a website related to the sample webpage, or user feedback data for the sample webpage.

According to embodiments of the present disclosure, the attribute data related to the sample webpage includes at least one selected from: a number of link to the outside of the webpage, a number of link to the inside of the webpage, or link-related text data of the webpage. The attribute data of the website related to the sample webpage includes at least one selected from: a number of link to the inside of the website, a number of link to the outside of the website, or user feedback data for the website related to the sample webpage. The user feedback data for the sample webpage includes at least one selected from: add-to-favorites behavior data, thumb-up behavior data, sharing behavior data, or comment data.

According to embodiments of the present disclosure, the present disclosure further provides an electronic device, a readable storage medium, and a computer program product.

According to embodiments of the present disclosure, an electronic device is provided, including: at least one processor; and a memory communicatively connected to the at least one processor, wherein the memory stores instructions executable by the at least one processor, and the instructions, when executed by the at least one processor, cause the at least one processor to implement the methods as described above.

According to embodiments of the present disclosure, a non-transitory computer-readable storage medium having computer instructions therein is provided, and the computer instructions are configured to cause a computer to implement the methods as described above.

According to embodiments of the present disclosure, a computer program product containing a computer program is provided, and the computer program, when executed by a processor, causes the processor to implement the methods as described above.

Figure 10:
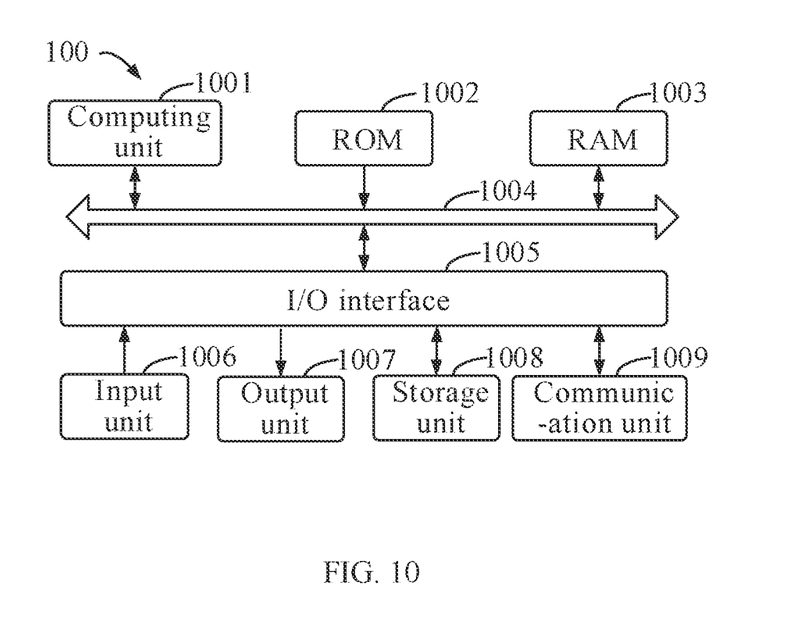
FIG. 10 schematically shows a block diagram of an electronic device suitable for implementing a method of evaluating data according to embodiments of the present disclosure.

FIG. 10 shows a schematic block diagram of an exemplary electronic device 1000 provided by embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 10, the electronic device 1000 includes a computing unit 1001 which may perform various appropriate actions and processes according to a computer program stored in a read only memory (ROM) 1002 or a computer program loaded from a storage unit 1008 into a random access memory (RAM) 1003. In the RAM 1003, various programs and data necessary for an operation of the electronic device 1000 may also be stored. The computing unit 1001, the ROM 1002 and the RAM 1003 are connected to each other through a bus 1004. An input/output (I/O) interface 1005 is also connected to the bus 1004.

A plurality of components in the electronic device 1000 are connected to the I/O interface 1005, including: an input unit 1006, such as a keyboard, or a mouse; an output unit 1007, such as displays or speakers of various types; a storage unit 1008, such as a disk, or an optical disc; and a communication unit 1009, such as a network card, a modem, or a wireless communication transceiver. The communication unit 1009 allows the electronic device 1000 to exchange information/data with other devices through a computer network such as Internet and/or various telecommunication networks.

The computing unit 1001 may be various general-purpose and/or dedicated processing assemblies having processing and computing capabilities. Some examples of the computing unit 1001 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 1001 executes various methods and processes described above, such as the method of evaluating data. For example, in some embodiments, the method of evaluating data may be implemented as a computer software program which is tangibly embodied in a machine-readable medium, such as the storage unit 1008. In some embodiments, the computer program may be partially or entirely loaded and/or installed in the electronic device 1000 via the ROM 1002 and/or the communication unit 1009. The computer program, when loaded in the RAM 1003 and executed by the computing unit 1001, may execute one or more steps in the method of evaluating data. Alternatively, in other embodiments, the computing unit 1001 may be used to perform the method of evaluating data by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The relationship between the client and the server is generated through computer programs running on the corresponding computers and having a client-server relationship with each other. The server may be a cloud server, a server of a distributed system, or a server combined with a block-chain.

It should be understood that steps of the processes illustrated above may be reordered, added or deleted in various manners. For example, the steps described in the present disclosure may be performed in parallel, in sequence, or in a different order, as long as a desired result for the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be contained in the scope of protection of the present disclosure.

What is claimed is:

1. A computer-implemented method of evaluating data, comprising:

acquiring, in response to a request for identifying a quality of index data to be identified, target association data of a target webpage corresponding to the index data to be identified, wherein the target webpage is a webpage having an unknown web content, and the target association data indicates a quality of the target webpage corresponding to the index data to be identified;

inputting the target association data into an evaluation model to obtain a quality evaluation result for the index data to be identified; and retaining the index data to be identified in an index database or deleting the index data to be identified from an index database based on the quality evaluation result, so as to improve quality of webpages presented by a search engine, wherein the computer-implemented method further comprises: before inputting the target association data into an evaluation model to obtain a quality evaluation result for the index data to be identified:
- determining, from the target association data, target association data of a target type; and
- extracting, from the target association data of the target type, a target association feature of the target type as the target association data, and wherein the target association data of the target type comprises user feedback data for the target webpage, and the extracting, from the target association data of the target type, a target association feature of the target type comprises:
- extracting a user feedback feature from the user feedback data for the target webpage by using a feedback feature extraction model, wherein the feedback feature extraction model comprises an encoding and decoding module, a first fully connected layer, a Long Short-Term Memory network module, and a second fully connected layer connected in sequence.

2. The method according to claim 1, wherein the target association data of the target type further comprises link-related text data of the webpage, and the extracting, from the target association data of the target type, a target association feature of the target type comprises:
- extracting a text feature from the link-related text data of the webpage by using a text feature extraction model, wherein the text feature extraction model comprises a tokenization module and a convolutional neural network module connected in sequence.

3. The method according to claim 1, wherein the target association data further comprises at least one selected from: attribute data related to the target webpage or attribute data of a website related to the target webpage.

4. The method according to claim 3, wherein,
- the attribute data related to the target webpage comprises at least one selected from: a number of link to an outside of the webpage, a number of link to an inside of the webpage, or link-related text data of the webpage;
- the attribute data of the website related to the target webpage comprises at least one selected from: a number of link to an inside of the website, a number of link to an outside of the website, or user feedback data for the website related to the target webpage; and
- the user feedback data for the target webpage comprises at least one selected from: add-to-favorites behavior data, thumb-up behavior data, sharing behavior data, or comment data.

5. A method of training an evaluation model implemented in the method according to claim 1, comprising:
- determining a plurality of quality problem types for index data;
- acquiring, for each quality problem type of the plurality of quality problem types, training data matched with each quality problem type and a label corresponding to the training data, wherein the training data comprises target association data of a sample webpage corresponding to sample index data, the sample webpage is a webpage having an unknown web content, and the label indicates a quality of the sample index data; and
- training the evaluation model by using the training data and the label so as to obtain a trained evaluation model.

6. The method according to claim 5, wherein the training the evaluation model by using the training data and the label so as to obtain a trained evaluation model comprises:
- determining, from the training data, training data of a target type;
- extracting a training feature of the target type from the training data of the target type; and
- training the evaluation model by using the training feature of the target type and the label, so as to obtain the trained evaluation model.

7. An electronic device, comprising:
at least one processor; and
a memory communicatively connected to the at least one processor, wherein the memory stores instructions executable by the at least one processor, and the instructions, when executed by the at least one processor, cause the at least one processor to implement the method of training the evaluation module according to claim 5.

8. The electronic device according to claim 7, wherein the instructions are further configured to cause the at least one processor to at least:
- determine, from the training data, training data of a target type;
- extract a training feature of the target type from the training data of the target type; and
- train the evaluation model by using the training feature of the target type and the label, so as to obtain the trained evaluation model.

9. A non-transitory computer-readable storage medium having computer instructions therein, wherein the computer instructions are configured to cause a computer to implement the method of training the evaluation module according to claim 8.

10. The non-transitory computer-readable storage medium according to claim 9, wherein the instructions are further configured to cause the computer to at least:
- determine, from the training data, training data of a target type;
- extract a training feature of the target type from the training data of the target type; and
- train the evaluation model by using the training feature of the target type and the label, so as to obtain the trained evaluation model.

11. An electronic device, comprising:
at least one processor; and
a memory communicatively connected to the at least one processor, wherein the memory stores instructions executable by the at least one processor, and the instructions, when executed by the at least one processor, cause the at least one processor to implement the method of evaluating data according to claim 1.

12. The electronic device according to claim 11, wherein the target association data of the target type further comprises link-related text data of the webpage, and wherein the instructions are further configured to cause the at least one processor to at least:
- extract a text feature from the link-related text data of the webpage by using a text feature extraction model, wherein the text feature extraction model comprises a tokenization module and a convolutional neural network module connected in sequence.

13. A non-transitory computer-readable storage medium having computer instructions therein, wherein the computer instructions are configured to cause a computer to implement the method of evaluating data according to claim 1.

\* \* \* \* \*